United States Patent
Kimn

(10) Patent No.: US 9,261,995 B2
(45) Date of Patent: Feb. 16, 2016

(54) APPARATUS, METHOD, AND COMPUTER READABLE RECORDING MEDIUM FOR SELECTING OBJECT BY USING MULTI-TOUCH WITH RELATED REFERENCE POINT

(71) Applicant: Samsung Electronics Co., Ltd., Suwon-si, Gyeonggi-do (KR)

(72) Inventor: Soung-Kwan Kimn, Pyeongtaek-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/249,718

(22) Filed: Apr. 10, 2014

(65) Prior Publication Data

US 2014/0362003 A1 Dec. 11, 2014

(30) Foreign Application Priority Data

Jun. 10, 2013 (KR) .......................... 10-2013-0065834

(51) Int. Cl.
 G06F 3/041 (2006.01)
 G06F 3/0484 (2013.01)
 G06F 3/0488 (2013.01)

(52) U.S. Cl.
 CPC .............. *G06F 3/041* (2013.01); *G06F 3/0488* (2013.01); *G06F 3/04842* (2013.01); *G06F 3/04883* (2013.01); *G06F 2203/04104* (2013.01); *G06F 2203/04808* (2013.01)

(58) Field of Classification Search
 CPC ............ G06F 2203/04104; G06F 2203/04808; G06F 3/041; G06F 3/0488; G06F 3/04883
 See application file for complete search history.

(56) References Cited

U.S. PATENT DOCUMENTS

| | | | |
|---|---|---|---|
| 2005/0046621 A1* | 3/2005 | Kaikuranta | G06F 3/03547 345/173 |
| 2009/0282332 A1 | 11/2009 | Porat | |
| 2009/0284495 A1* | 11/2009 | Geaghan et al. | 345/174 |
| 2009/0327272 A1* | 12/2009 | Koivunen | 707/5 |
| 2010/0259499 A1* | 10/2010 | Kaikuranta | G06F 3/03547 345/173 |
| 2010/0302212 A1* | 12/2010 | Weber | G06F 3/04886 345/178 |
| 2012/0169671 A1* | 7/2012 | Yasutake | 345/175 |
| 2012/0229493 A1 | 9/2012 | Kim et al. | |
| 2012/0306772 A1 | 12/2012 | Tan et al. | |
| 2013/0047093 A1 | 2/2013 | Reuschel et al. | |
| 2013/0127825 A1* | 5/2013 | Joshi | G06T 19/20 345/419 |

(Continued)

FOREIGN PATENT DOCUMENTS

| | | |
|---|---|---|
| EP | 2 098 947 A2 | 9/2009 |
| KR | 10-2010-0122379 A | 11/2010 |

(Continued)

*Primary Examiner* — Gene W Lee
(74) *Attorney, Agent, or Firm* — Jefferson IP Law, LLP

(57) ABSTRACT

A method of selecting an object by using a multi-touch, by which the object displayed on a screen of an electronic device is selected, is provided. The method includes determining whether at least two touches are input to a touch screen of an electronic device, determining a reference point from touch points where the at least two touches have been input, when it is determined that the at least two touches have been input, tracking a path along which the determined reference point is moved, as the at least two touch points are moved on the touch screen, and selecting at least one object corresponding to the moving path of the reference point on a screen displayed on the touch screen.

27 Claims, 14 Drawing Sheets

(56) References Cited

U.S. PATENT DOCUMENTS

2013/0201155 A1* 8/2013 Wu .................... G06F 3/03547
　　　　　　　　　　　　　　　　　　　　　　345/174
2014/0337139 A1* 11/2014 Thomas et al. ............ 705/14.66

FOREIGN PATENT DOCUMENTS

KR　　10-2012-0061038 A　　6/2012
KR　　10-2012-0103075 A　　9/2012

* cited by examiner

APPARATUS, METHOD, AND COMPUTER READABLE RECORDING MEDIUM FOR SELECTING OBJECT BY USING MULTI-TOUCH WITH RELATED REFERENCE POINT

CROSS-REFERENCE TO RELATED APPLICATION(S)

This application claims the benefit under 35 U.S.C. §119 (a) of a Korean patent application filed on Jun. 10, 2013 in the Korean Intellectual Property Office and assigned Serial No. 10-2013-0065834, the entire disclosure of which is hereby incorporated by reference.

TECHNICAL FIELD

The present disclosure relates to an electronic device. More particularly, the present disclosure relates to an apparatus and a method for selecting an object by using a multi touch.

BACKGROUND

As the number and complexity of services and functions provided by a mobile device (e.g., a smart phone) has increased, so too has the use of these features. To support many of these features, most mobile devices are now provided with a Graphic User Interface (GUI) using a touch screen. Further, diverse applications executable in the mobile device have been developed in order to enhance an effective value of the mobile device, and satisfy various needs of users.

Basic applications that are manufactured by device manufacturing companies and installed in the devices, and additional applications that are downloaded from various websites through the internet may be stored and executed in the mobile device. The additional applications may be developed by general developers and registered in the various websites.

A variety of methods may be used for selection of an object (e.g., a text, an image, an image list, or the like) that is being displayed on a screen in an electronic device such as a mobile device (e.g., a smart phone) including a touch screen. For example, a specific object displayed on the screen may be selected using an object selection mode in a separate sub-menu of an executed application. In another method, an object selection mode may be entered through inputting a specific key. However, in these object selecting methods, a separate menu must be selected in order to switch to the object selection mode, and additional operations must be performed in order to select the object after selection of a mode switching function.

Switching to the object selection mode may also be performed by touching desired characters for a long time for the sake of selecting a specific text among currently displayed objects on a screen. That is, an area including the desired characters is blocked and displayed when a specific area including the characters is touched for a long time. At this time, a user may select the characters by dragging indicators that are separately displayed at start and end portions of the displayed area. However, since the user must maintain the touch for a long time in order to make the selection, the user finds difficulty in rapidly selecting the object. Moreover, since the user must drag the indicators, which are displayed having a small size on the screen, for the sake of designating a selection area even after switching to the object selection mode, the method is inconvenient for selecting a text area.

Accordingly, an object selecting method, in which a variety of objects displayed on a screen can be immediately selected by one touch without an unnecessary process for the sake of switching to the object selection mode, is needed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for selecting an object by using a multi-touch, wherein a user can select a desired area of a text, which is being displayed on a screen, with one input that includes a plurality of touches.

Another aspect of the present disclosure is to provide an apparatus and a method for selecting an object by using a multi-touch, wherein a user can select at least one object in a multi-list, which is being displayed on a screen, with one input that includes a plurality of touches.

Another aspect of the present disclosure is to provide an apparatus and a method for selecting an object by using a multi-touch, wherein a user can select a desired area of an image, which is being displayed on a screen, with one input that includes a plurality of touches.

In accordance with an aspect of the present disclosure, a method of selecting an object by using a multi-touch is provided. The method includes determining whether at least two touches are input to a touch screen of an electronic device, determining a reference point from touch points where the at least two touches have been input, when it is determined that the at least two touches have been input, tracking a path along which the determined reference point is moved, as the at least two touch points are moved on the touch screen, and selecting at least one object corresponding to the moving path of the reference point on a screen displayed on the touch screen.

The method may further include switching to an object selection mode, when it is determined that the at least two touches have been input.

The determining of whether the at least two touches are input may include determining that the at least two touches have been input when a difference in touch times for the at least two touches is within a threshold time interval.

The reference point may be determined as a midpoint between locations where two or more touches have been input.

The reference point may be determined through assigning a weight to one or more locations where two or more touches have been input.

The method may further include analyzing a type of object at the determined reference point, after the determining of the reference point.

The method may further include setting a horizontal coordinate of the reference point to be closer to a touch location of a left touch among two touches, and setting a vertical coordinate of the reference point to be closer to a touch location of a right touch among the two touches, in a case where it is determined through the analyzing of the type of the object that the object is a text.

The method may further include determining an area within a looped curve as a selection area when the moving path of the reference point forms the looped curve, in a case where it is determined that the object is an image.

The method may further include selecting an object corresponding to at least one check box along the moving path of the reference point, in a case where it is determined that the object is a multi-list.

In accordance with another aspect of the present disclosure, an apparatus for selecting an object by using a multi-touch is provided. The apparatus includes a touch screen configured to display at least one object, and a controller configured to determine whether at least two touches are input to the touch screen, to determine a reference point from touch points where the at least two touches have been input when it is determined that the at least two touches have been input, to track a path along which the determined reference point is moved as the at least two touch points are moved on the touch screen, and to select at least one object corresponding to the moving path of the reference point on a screen displayed on the touch screen.

The controller may control switching to an object selection mode when it is determined that the at least two touches have been input.

The controller may determine that the at least two touches have been input when a difference in touch times for the at least two touches is within a threshold time interval.

The reference point may be determined as a midpoint between locations where two or more touches have been input.

The reference point may be determined through assigning a weight to one or more locations where two or more touches have been input.

The controller may analyze a type of the object at the determined reference point after determining the reference point.

A horizontal coordinate of the reference point may be set to be closer to a touch location of a left touch among two touches, and a vertical coordinate of the reference point may be set to be closer to a touch location of a right touch among the two touches, in a case where it is determined that the object is a text.

An area within a looped curve may be determined as a selection area when the moving path of the reference point forms the looped curve, in a case where it is determined that the object is an image.

An object corresponding to at least one check box along the moving path of the reference point may be selected, in a case where it is determined that the object is a multi-list.

Information on the method of selecting an object by using a multi-touch may be stored in a computer readable recording medium. The recording medium includes any kind of recording mediums in which programs and data are stored to be read by a computer system. For example, the recording medium includes a Read Only Memory (ROM), a Random Access Memory (RAM), a Compact Disk (CD), a Digital Video Disk (DVD), a magnetic tape, a floppy disk, an optical data storage device, an embedded Multi-Media Card (eMMC), and the like. Further, the recording medium may be distributed in computer systems connected with each other through a network so that a computer readable code may be stored and executed in a distributed manner.

According to embodiments of the present disclosure, a variety of objects, which are being displayed on a screen, can be selected by one touch without an unnecessary process for the sake of switching to an object selection mode.

According to embodiments of the present disclosure, a desired area of a text, which is being displayed on a screen, can be selected by a single input that includes a plurality of touches.

According to embodiments of the present disclosure, at least one object in a multi-list, which is being displayed on a screen, can be selected by a single input that includes a plurality of touches.

According to embodiments of the present disclosure, a desired area of an image, which is being displayed on a screen, can be selected by a single input that includes a plurality of touches.

Accordingly, various types of objects, which are being displayed on a screen of an electronic device such as a smart phone including a screen display unit, can be easily selected, and thus a convenient user experience can be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
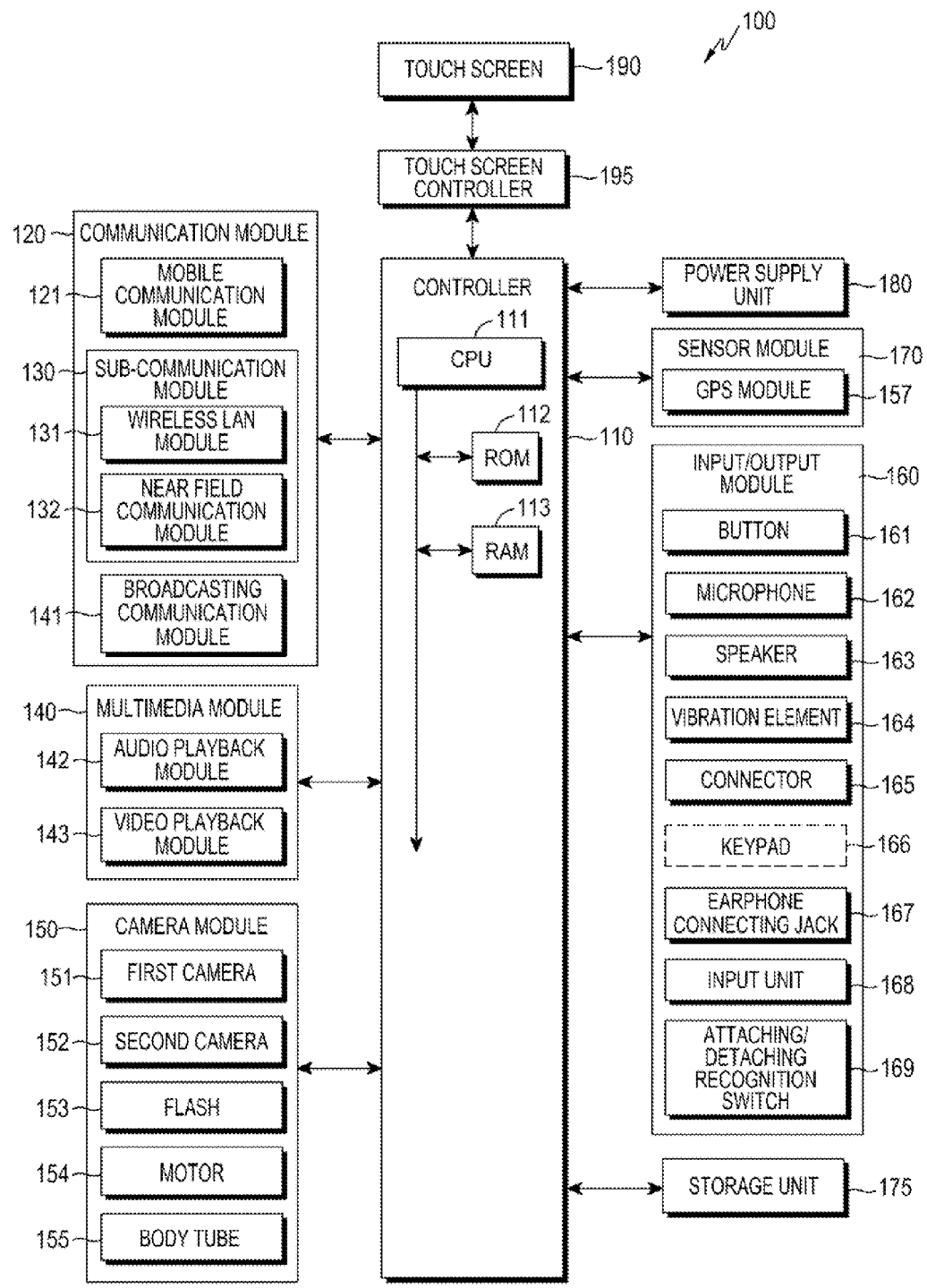
FIG. 1 is a block diagram illustrating an example of a portable terminal as an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While terms including ordinal numbers, such as "first" and "second," etc., may be used to describe various components, such components are not limited by the above terms. The terms are used merely for the purpose to distinguish an element from the other elements. For example, a first element could be termed a second element, and similarly, a second element could be also termed a first element without departing from the scope of the present disclosure. As used herein, the term "and/or" includes any and all combinations of one or more of the associated listed items. The terms used herein are merely used to describe specific embodiments, and are not intended to limit the present disclosure.

As used herein, terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Unless defined otherwise, all terms used herein have the same meaning as commonly understood by those of skill in the art. Such terms as those defined in a generally used dictionary are to be interpreted to have the meanings equal to the contextual meanings in the relevant field of art, and are not to be interpreted to have ideal or excessively formal meanings unless clearly defined in the present specification. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In embodiments of the present disclosure, a method and an apparatus for selecting an object by using a multi-touch for selection of the object displayed on a screen of an electronic device are disclosed. Automatic switching to an object selection mode may be performed by inputting a plurality of touches, for example, two touches (hereinafter, referred to as a multi-touch) according to embodiments of the present disclosure, and at least one object corresponding to a moving path may be selected through tracking the moving path of the input touches.

Objects that can be selected according to embodiments of the present disclosure may include a text, an image, a multi-list, and the like, and the present disclosure is not limited thereto.

For example, text corresponding to a moving path of touches may be selected when touch points on a screen correspond to a text area. Further, an area within a looped curve, formed according to a moving path of touches, may be selected when touch points on a screen correspond to an image area. Furthermore, at least one object (e.g., a check box) corresponding to a moving path of touches may be selected when touch points on a screen correspond to a multi-list area. The term multi-list refers to a plurality of objects such as a file or a photograph that are cataloged and displayed. For example, a plurality of images may be displayed in the form of a thumbnail image, and check boxes may be further displayed in correspondence to the respective objects.

In the following description, the term "multi-touch" denotes a state in which a plurality of touches (e.g., two or more touches) are input to a touch screen. In various embodiments, it may be determined that the touches have been simultaneously input in a case where a difference in time when each of the plurality of touches has been input is within a threshold time interval.

The method and the apparatus for selecting an object by using a multi-touch according to embodiments of the present disclosure may be realized (i.e., implemented) in any electronic device that includes a display unit (e.g., a touch screen), and any electronic device, which displays various objects through the display unit and in which an application that may select a specific object on the screen can be installed, may be included in the electronic device according to an embodiment of the present disclosure.

Accordingly, in the present disclosure, the electronic device may be an arbitrary device including a touch screen, and may be referred to as a portable terminal, a mobile terminal, a communication terminal, a portable communication terminal, a portable mobile terminal, or the like. For example, the electronic device may be a smart phone, a cell phone, a game machine, a Television (TV), a display device, a vehicle head unit, a notebook computer, a laptop computer, a tablet computer, a Personal Media Player (PMP), a Personal Digital Assistants (PDA), a navigation device, an Automated Teller Machine (ATM) of a bank, a Point Of Sale (POS) device of a store, or the like. Further, the electronic device in the present disclosure may be a flexible device or a flexible display device.

A representative configuration of an electronic device is a portable terminal (e.g., a cell phone or a smart phone). In the following description, some elements of the representative configuration of the electronic device may be omitted or modified according to need. A configuration of a portable terminal that is an example of the electronic device to which the present disclosure is applied will be described with reference to FIGS. 1, 2, and, 3.

FIG. 1 is a block diagram illustrating an example of a portable terminal as an electronic device according to an embodiment of the present disclosure.

Referring to FIG. 1, a portable terminal 100 may be connected with an external electronic device by using at least one of a communication module 120, a connector 165, and an earphone connecting jack 167. The electronic device may include one of various devices, such as earphones, an external speaker, a Universal Serial Bus (USB) memory, a charger, a Cradle/Dock, a Digital Multimedia Broadcast (DMB) antenna, a mobile payment related device, a health care device (e.g., a blood sugar measuring device), a game machine, a vehicle navigation device, and the like, which may be detachably connected to the portable terminal 100 in a wired manner. Further, the electronic device may include a Bluetooth communication device which may be wirelessly connected, a Near Field Communication (NFC) device, a Wi-Fi Direct communication device, and a wireless Access Point (AP). The portable terminal 100 may be connected to another portable terminal or electronic device, for example, one of a cell phone, a smart phone, a tablet PC, a desktop PC, and a server by using a wired or wireless manner.

The portable terminal 100 may include at least one touch screen 190, and at least one touch screen controller 195. Further, the portable terminal 100 may include a controller 110, the communication module 120, a multimedia module 140, a camera module 150, an input/output module 160, a sensor module 170, a storage unit 175, and a power supply unit 180. The communication module 120 may include a mobile communication module 121, a sub-communication module 130, and a broadcasting communication module 141. The sub-communication module 130 may include at least one of a wireless LAN module 131 and a NFC module 132, and the multimedia module 140 may include at least one of an audio playback module 142, and a video playback module 143. The camera module 150 may include at least one of a first camera 151 and a second camera 152. The input/output module 160 may include at least one of a button 161, a microphone 162, a speaker 163, a vibration element 164, the connector 165, and a keypad 166.

The controller 110 may include a CPU 111, a ROM 112 in which a control program for the sake of control of the portable terminal 100 is stored, and a RAM 113 that stores a signal or data input from the outside of the portable terminal 100, or is used as a memory area for the sake of an operation performed in the portable terminal 100. The CPU 111 may include a single core, a dual core, a triple core, or a quad core. The CPU 111, the ROM 112, and the RAM 113 may be connected with each other through an internal bus.

The controller 110 may control the communication module 120, the multimedia module 140, the camera module 150, the input/output module 160, the sensor module 170, the storage unit 175, the power supply unit 180, the touch screen 190, and the touch screen controller 195.

At this time, the controller 110 determines that a plurality of touches have been input to a screen displayed on the touch screen 190, tracks a moving path of the plurality of touches on the screen, and thus may control such that a variety of objects can be selected, according to an embodiment of the present disclosure. Various functions of the controller 110 according to an embodiment of the present disclosure will be described later with reference to FIG. 4.

The controller 110 may sense a user input event such as a hovering event as an input unit 168 approaches the touch screen 190 or is located close to the touch screen 190. The controller 110 may determine a plurality of touches caused by a variety of input units (e.g., a touch through a touch screen), and control a function of selecting at least one object included on the screen, according to an embodiment of the present disclosure.

The controller 110 may detect a variety of user inputs received through the camera module 150, the input/output module 160, and the sensor module 170 as well as the touch screen 190. In addition to the touch, the user input may include various types of information, such as a gesture, a voice, an eye movement, iris recognition, a bio-signal of a user, and the like, which is input to the portable terminal. The controller 110 may control an operation or a function corresponding to the detected user input to be performed.

The controller 110 may output a control signal to the input unit 168 or the vibration element 164. The control signal may include information on a vibration pattern, and the input unit 168 or the vibration element 164 generates a vibration in response to the vibration pattern. The information on the vibration pattern may represent the vibration pattern itself and an identifier of the vibration pattern. Alternatively, the control signal may also include only a request for generation of a vibration.

The portable terminal 100 may include at least one of the mobile communication module 121, the wireless LAN module 131, and the NFC module 132 according to a performance thereof.

The mobile communication module 121 enables the portable terminal 100 to be connected with the external electronic device through mobile communication, by using one or a plurality of antennas (not illustrated) under the control of the controller 110. The mobile communication module 121 may transmit/receive a wireless signal for a voice call, a video call, a Short Message Service (SMS), or a Multimedia Message Service (MMS) to/from a cell phone, a smart phone, a tablet PC, or other electronic devices (not illustrated), which have phone numbers input to the portable terminal 100.

The sub-communication module 130 may include at least one of the wireless LAN module 131 and the NFC module 132. For example, the sub-communication module 130 may include only the wireless LAN module 131, or only the near field communication module 132. Alternatively, the sub-communication module 130 may include both the wireless LAN module 131 and the NFC module 132.

The wireless LAN module 131 may be connected to the internet at a place where a wireless Access Point (AP) is installed, under the control of the controller 110. The wireless LAN module 131 may support a wireless LAN protocol (e.g., IEEE 802.11x) of the Institute of Electrical and Electronics Engineers (IEEE). The NFC module 132 may perform NFC in a wireless manner between the portable terminal 100 and the external electronic device (not illustrated) under the control of the controller 110. The near field communication method may include Bluetooth, Infrared Data Association (IrDA), Wi-Fi direct communication, and Near Field Communication (NFC).

The broadcasting communication module 141 may receive a broadcasting signal (e.g., a TV broadcasting signal, a radio broadcasting signal, or a data broadcasting signal) and additional information (e.g., an Electric Program Guide (EPS), an Electric Service Guide (ESG) etc.), which are transmitted from a broadcasting station through a broadcasting communication antenna, under the control of the controller 110.

The multimedia module 140 may include the audio playback module 142 and the video playback module 143. The audio playback module 142 may play digital audio files (e.g., files with an extension such as mp3, wma, ogg, and wav) which are stored in the storage unit 175 or received under the control of the controller 110. The video playback module 143 plays digital video files (e.g., files with an extension such as mpeg, mpg, mp4, avi, mov, and mkv) which are stored or received under the control of the controller 110.

The multimedia module 140 may be integrated in the controller 110. The camera module 150 may include at least one of the first camera 151 and the second camera 152 which photograph a still image and a moving image under the control of the controller 110. Further, the camera module 150 may include at least one of a body tube 155 which performs zoom in/out for the sake of photographing a subject, a motor 154 which controls a movement of the body tube 155, and a flash 153 which provides a subsidiary light source necessary for photographing the subject. The first camera 151 may be disposed on a front surface of the portable terminal 100, and the second camera 152 may be disposed on a rear surface of the portable terminal 100.

The input/output module 160 may include at least one of at least one button 161, at least one microphone 162, at least one speaker 163, at least one vibration element 164, the connector 165, the keypad 166, the earphone connecting jack 167, and the input unit 168. The input/output module 160 is not limited thereto, and cursor control such as a mouse, a track ball, a joystick, or cursor direction keys may be provided in order to control a cursor movement on the touch screen 190.

The buttons 161 may be formed on a front surface, a side surface, or a rear surface of a housing (or a case) of the portable terminal 100, and may include at least one of a power/lock button, a volume button, a menu button, a home button, a back button, a search button, and the like. The microphone 162 may receive voices or sounds to generate electric signals under the control of the controller 110. The speaker 163 may output sounds corresponding to various signals or data (e.g., wireless data, broadcasting data, digital audio data, digital video data, and the like) to the outside of the portable terminal 100 under the control of the controller 110. The speaker 163 may output sounds corresponding to functions that the portable terminal 100 performs (e.g., a button operation tone corresponding to a telephone call, a call connection tone, a voice of a counterpart user, and the like). One or a plurality of speakers 163 may be formed at a proper location or locations of the housing of the portable terminal 100.

The vibration element 164 may convert an electric signal into a mechanical vibration under the control of the controller 110. For example, the vibration element 164 operates when the portable terminal 100 in a vibration mode receives a voice call or a video call from another device (not illustrated). One or a plurality of vibration elements 164 may be formed in the housing of the portable terminal 100. The vibration element 164 may operate to correspond to the user input through the touch screen 190.

The connector 165 may be used as an interface for the sake of connecting the portable terminal 100 with the external electronic device or a power source. The controller 110 may transmit data stored in the storage unit 175 of the portable terminal 100 to the external electronic device or may receive data from the external electronic device through a wired cable connected to the connector 165. Further, the portable terminal 100 may receive electric power from the power source through the wired cable connected to the connector 165 or may charge a battery by using the power source.

The keypad 166 may receive a key input from a user for the sake of control of the portable terminal 100. The keypad 166 may include a physical keypad formed in the portable terminal 100 or a virtual keypad displayed on the touch screen 190. The physical keypad formed in the portable terminal 100 may be excluded according to a performance or a structure of the portable terminal 100. Earphones may be inserted into the earphone connecting jack 167 to be connected to the portable terminal 100.

The input unit 168 may be inserted into and kept in the portable terminal 100, and may be extracted or separated from the portable terminal 100 when being used. An attaching/detaching recognition switch 169 that operates to correspond to attaching and detaching of the input unit 168 may be installed at an area in the portable terminal 100 into which the input unit 168 is inserted, and may provide a signal corresponding to the attaching and the detaching of the input unit 168 to the controller 110. The attaching/detaching recognition switch 169 may be configured to directly or indirectly contact the input unit 168 when the input unit 168 is mounted. Accordingly, the attaching/detaching recognition switch 169 may generate a signal corresponding to the attaching or the detaching of the input unit 168 (that is, a signal that notifies of the attaching or the detaching of the input unit 168) based on whether contact is made with the input unit 168, and output the signal to the controller 110.

The sensor module 170 includes at least one sensor that detects a state of the portable terminal 100. For example, the sensor module 170 may include at least one of a proximity sensor that detects a user's proximity to the portable terminal 100, an illumination sensor that detects a quantity of light around the portable terminal 100, a motion sensor that detects a motion of the portable terminal 100 (e.g., rotation of the portable terminal 100, acceleration or vibration of the portable terminal 100, etc.), a geo-magnetic sensor which detects a point of a compass of the portable terminal 100 by using Earth's magnetic field, a gravity sensor which detects an action direction of gravity, an altimeter that detects an altitude by measuring atmospheric pressure, a GPS module 157, and the like.

The GPS module 157 may receive electric waves (e.g., signals) from a plurality of GPS satellites in Earth orbit, and may calculate a location of the portable terminal 100 by using arrival times of the electric waves from the GPS satellites to the portable terminal 100.

The storage unit 175 may store a signal or data, which is input and output according to an operation of the communication module 120, the multimedia module 140, the camera module 150, the input/output module 160, the sensor module 170, or the touch screen 190, under the control of the controller 110. The storage unit 175 may store control programs for control of the portable terminal 100 or the controller 110, or applications.

The term "storage unit" denotes an arbitrary data storage device such as the storage unit 175, the ROM 112 and the RAM 113 in the controller 110, or a memory card (e.g., an SD card, a memory stick, etc.) that is mounted to the portable terminal 100. The storage unit 175 may also include a non-volatile memory, a volatile memory, a Hard Disk Drive (HDD), a Solid State Drive (SSD), and the like.

The storage unit 175 may store applications with various functions such as a navigation, a video call, a game and a time based alarm application, images for the sake of providing a Graphic User Interface (GUI) related to the applications, user information, a document, databases or data related to a method of processing a touch input, background images (a menu screen and a standby screen) or operating programs necessary for driving the portable terminal 100, and images photographed by the camera module 150.

Further, the storage unit 175 may store information on or related to at least one object selected through a multi-touch according to an embodiment of the present disclosure, and store at least one piece of information related to a moving path of a touch when the moving path of the touch is tracked according to an embodiment of the present disclosure.

The storage unit 175 is a machine (e.g., a computer) readable medium, and the term referred to as a machine readable medium may be defined as a medium that provides data to the machine such that the machine may perform a specific function. The storage unit 175 may include non-volatile media and volatile media. All such mediums should be something tangible such that commands transferred through the mediums may be detected by a physical mechanism that reads the commands into the machine.

The machine readable medium is not limited thereto, and includes at least one of a floppy disk, a flexible disk, a hard disk, a magnetic tape, a Compact Disc Read-Only Memory (CD-ROM), an optical disk, a punch card, a paper tape, a RAM, a Programmable Read-Only Memory (PROM), an Erasable PROM (EPROM), a FLASH-EPROM, an embedded Multi Media Card (eMMC), and the like.

The power supply unit 180 may supply electric power to one or a plurality of batteries, which is disposed in the housing of the portable terminal 100, under the control of the controller 110. The one or the plurality of batteries supply the electric power to the portable terminal 100. Further, the power supply unit 180 may supply electric power, which is input from an external power source through a wired cable connected with the connector 165, to the portable terminal 100. Furthermore, the power supply unit 180 may also supply electric power, which is wirelessly input from an external power source through a wireless charging technology, to the portable terminal 100.

The portable terminal 100 may include at least one touch screen 190 that provides user graphic interfaces corresponding to various services (e.g., a telephone call, data transmission, broadcasting, photography, etc.) to the user. The touch screen 190 may output an analog signal corresponding to at least one user input, which is input to the user graphic interface, to the touch screen controller 195.

The touch screen 190 may receive at least one user input through a user's body (e.g., a finger including a thumb) or the input unit 168 (e.g., a stylus pen, an electronic pen, etc.). For example, the touch screen 190 may be realized by a resistive method, a capacitive method, an infrared method, an acoustic wave method, or a combination of the methods.

The touch screen 190 may include at least two touch panels that can sense touches or close access of the finger and the input unit 168, respectively, such that inputs through the finger and the input unit 168 may be received. The at least two touch panels may provide mutually different output values to the touch screen controller 195, and the touch screen controller 195 may differently recognize the values input from the at least two touch screen panels and identify which of the inputs through the finger and the input unit 168 the input from the touch screen 190 corresponds to.

The touch is not limited to the contact between the touch screen 190 and the user's body or the touchable input unit, and may include non-contact (e.g., a state where a detectable interval between the touch screen 190 and the user's body or the touchable input unit is 1 mm or less). The detectable interval in the touch screen 190 may be varied according to a performance or a structure of the portable terminal 100.

The touch screen controller 195 converts an analog signal input from the touch screen 190 into a digital signal, and transmits the digital signal to the controller 110. The controller 110 may control the touch screen 190, by using the digital signal received from the touch screen controller 195. The touch screen controller 195 may detect a value (e.g., a current value) output through the touch screen 190 to identify a hovering interval or distance as well as a location of the user input, and may also convert the identified distance value into a digital signal (e.g., Z-coordinate) to provide the digital signal to the controller 110. Further, the touch screen controller 195 may detect a value (e.g., a current value) output through the touch screen 190 to detect a pressure that the user input unit applies to the touch screen 190, and may also convert the identified pressure value into a digital signal to provide the digital signal to the controller 110.

Furthermore, the touch screen controller 195 may convert a plurality of analog signals input from the touch screen 190 into digital signals to transmit the digital signals to the controller 110, according to an embodiment of the present disclosure. At this time, the controller 110 may determine whether a plurality of touches are input, through the plurality of digital signals received from the touch screen controller 195.

Figure 2:
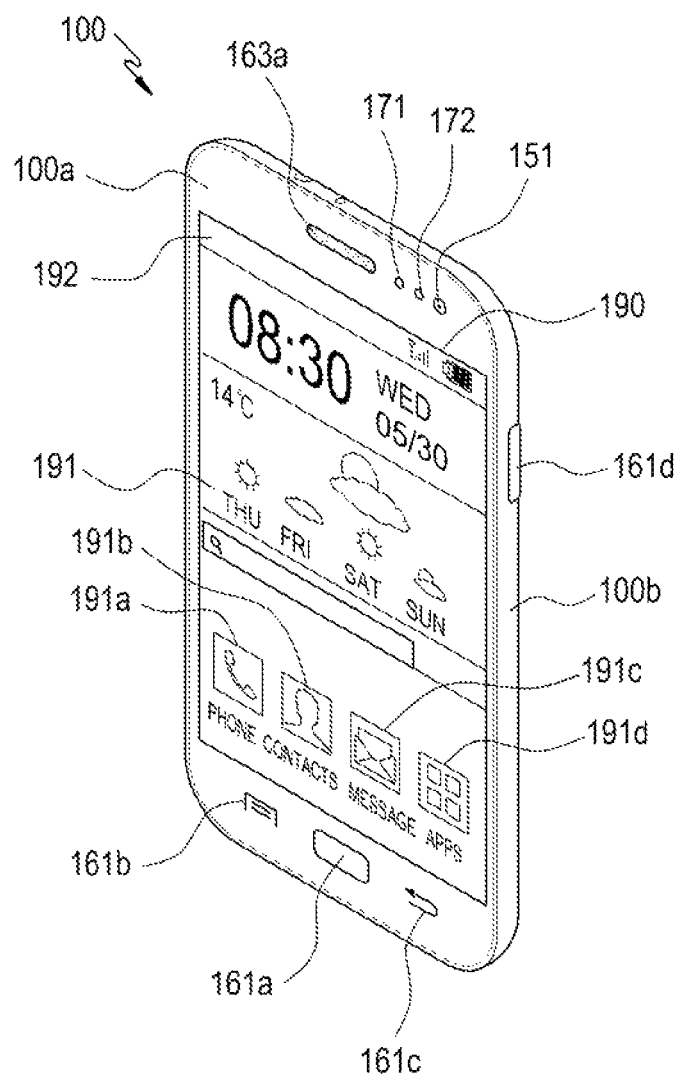
FIG. 2 is a front perspective view illustrating a portable terminal according to an embodiment of the present disclosure.
Figure 3:
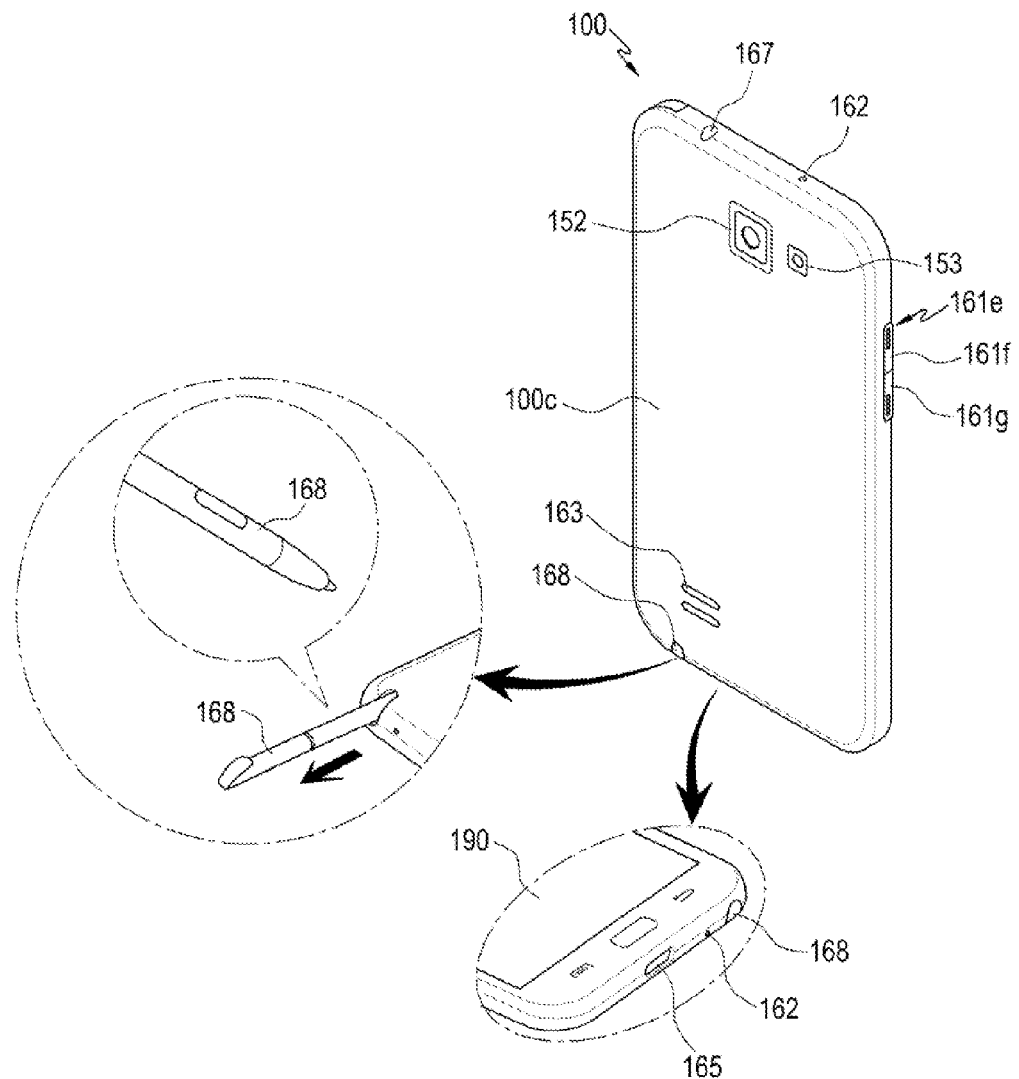
FIG. 3 is a rear perspective view illustrating a portable terminal according to an embodiment of the present disclosure.

FIG. 2 is a front perspective view illustrating a portable terminal according to an embodiment of the present disclosure, and FIG. 3 is a rear perspective view illustrating a portable terminal according to an embodiment of the present disclosure.

Referring to FIGS. 2 and 3, a touch screen 190 is disposed at a central area of a front surface 100a of a portable terminal 100. The touch screen 190 may be largely formed to occupy most of the front surface 100a of the portable terminal 100. FIG. 2 illustrates an embodiment in which a main home screen is displayed on the touch screen 190. The main home screen corresponds to a first screen displayed on the touch screen 190, when a power source of the portable terminal 100 is turned on. Further, the main home screen may correspond to a first home screen among several pages of home screens in a case where the portable terminal 100 has several pages of different home screens. In the example of FIGS. 2 and 3, a weather application 191 is illustrated as part of the home screen. Shortcut icons 191a, 191b, and 191c for the sake of executing frequently used applications, a main menu switching key 191d, time, and weather may be displayed in the home screen. A menu screen is displayed on the touch screen 190 when a user selects the main menu switching key 191d. Furthermore, a status bar 192 that displays a status of the portable terminal 100 such as a battery charging status, an intensity of a received signal, the current time, and the like may also be formed at an upper end portion of the touch screen 190.

A home button 161a, a menu button 161b, and a back button 161c may be formed below the touch screen 190. The main home screen is displayed on the touch screen 190 through the home button 161a. For example, in a state where the menu screen or another home screen different from the main home screen is being displayed on the touch screen 190, when the home button 161a is selected, the main home screen may be displayed on the touch screen 190. Moreover, the main home screen illustrated in FIG. 2 may be displayed on the touch screen 190 when the home button 161a is selected while the applications are executed on the touch screen 190. Furthermore, the home button 161a may also be used to allow displaying of recently used applications or a task manager on the touch screen 190.

The menu button 161b provides a connection menu that may be displayed on the touch screen 190. The connection menu may include a widget addition menu, a background image change menu, a search menu, an edition menu, an environment setup menu, and the like.

The back button 161c may be used to display a screen that was executed shortly before a currently executed screen, or terminate the most recently used application.

A first camera 151, an illumination sensor 171, a proximity sensor 172, and an ear speaker 163a may be disposed at an edge of the front surface 100a of the portable terminal 100. A second camera 152, a flash 153, and a speaker 163 may be disposed on a rear surface 100c of the portable terminal 100.

For example, a power/lock button 161d, a volume button 161e including a volume up button 161f and a volume down button 161g, a terrestrial DMB antenna (not shown) for reception of broadcasting, and one or a plurality of microphones 162 may be disposed on a side surface 100b of the portable terminal 100. The DMB antenna may be fixed to the portable terminal 100, or may be formed detachably from the portable terminal 100.

A connector 165 is formed on a lower side surface of the portable terminal 100. A plurality of electrodes are formed in the connector 165, and may be wiredly connected with the electronic device. An earphone jack 167 may be formed on an upper side surface of the portable terminal 100. Earphones may be inserted into the earphone jack 167.

An input unit 168 may be mounted on the lower side surface of the portable terminal 100. The input unit 168 may be inserted into and kept in the portable terminal 100, and may be extracted and separated from the portable terminal 100 for use.

A structure of the portable terminal 100 which is an example of the electronic device to which the present disclosure may be applied has been described above.

Hereinafter, an apparatus and a method of selecting an object by using a multi-touch according to embodiments of the present disclosure will be described with reference to FIGS. 4, 5, 6, 7, and 8.

Figure 4:
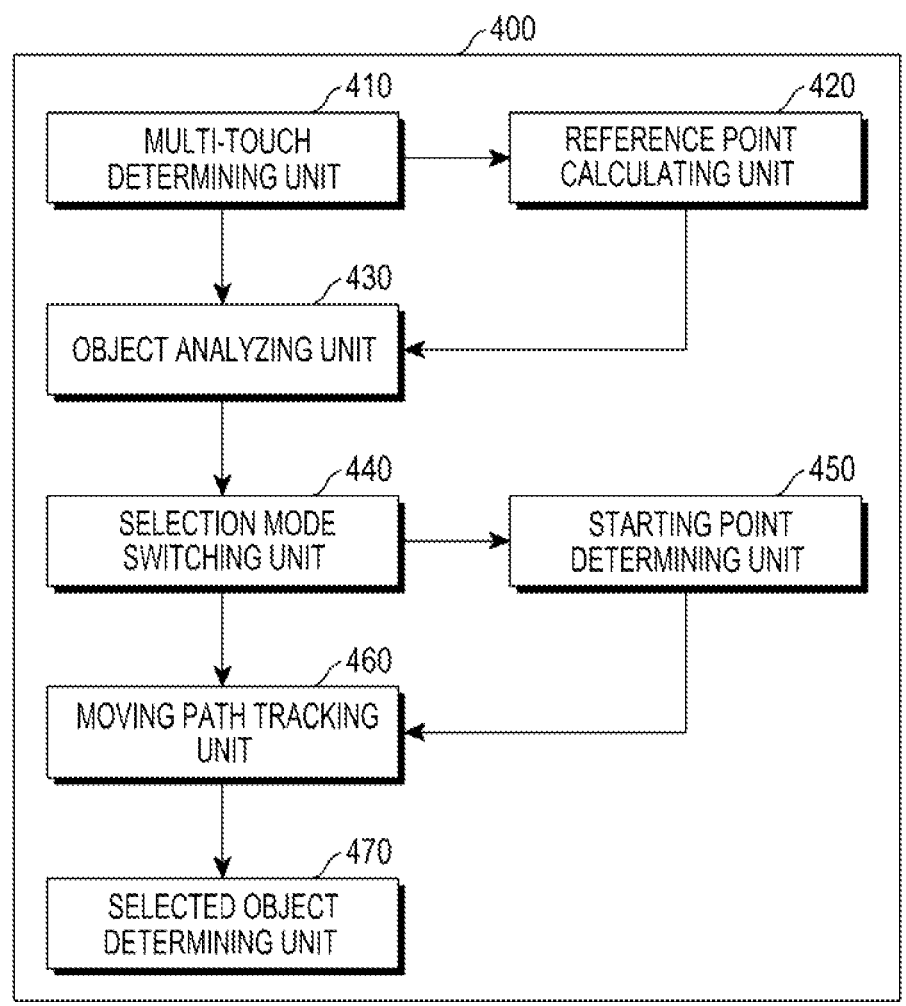
FIG. 4 is a block diagram illustrating an apparatus for selecting an object by using a multi-touch according to an embodiment of the present disclosure.

FIG. 4 is a block diagram illustrating an apparatus for selecting an object by using a multi-touch according to an embodiment of the present disclosure.

Referring to FIG. 4, the apparatus 400 may be configured to include one or more of a multi-touch determining unit 410, a reference point calculating unit 420, an object analyzing unit 430, a selection mode switching unit 440, a starting point determining unit 450, a moving path tracking unit 460, and a selected object determining unit 470. In various embodiments, some components of the apparatus 400 may be included in the controller 110 of the portable terminal 100 of FIG. 1.

The multi-touch determining unit 410 determines whether a multi-touch is input. In an embodiment, the multi-touch determining unit 410 determines whether a multi-touch is input based on signals that are received by a plurality of touches input through a touch screen. At this time, a method of determining whether the multi-touch is input may be variously realized. For example, according to an embodiment of the present disclosure, the multi-touch determining unit 410 may compare times when each of the plurality of touches are input, regard the touches as being input when a difference in the input times is within a threshold time interval, and thus determine that the multi-touch has been input. For example, the multi-touch determining unit 410 may determine a time at which a first touch is input, may determine a time at which a second touch is input, and may determine if the difference between the input times is less than a threshold. In an embodiment, the difference between the input times may be zero.

The object analyzing unit 430 may analyze which type of object the currently multi-touched portions on the screen of the touch screen correspond to, as the multi-touch determining unit 410 determines that the multi-touch has been input. For example, the multi-touched portions may be a text area, an image area, or a multi-list for selection. At this time, the object may be determined based on any one of a plurality of multi-touch points, or may also be determined through calculating a separate reference point from the plurality of touch points according to another embodiment of the present disclosure.

The reference point calculating unit 420 may perform a function of calculating the reference point for an object analysis from the plurality of touch points where the multi-touch is input. At this time, a method of calculating the reference point may be variously realized. For example, the reference point calculating unit 420 may set a midpoint between two input touch points as the reference point, or may also set the reference point by assigning a weight to each of the touch points. Specific embodiments regarding this function will be described later with reference to FIGS. 12, 13, 14, and 15.

The selection mode switching unit 440 performs a function of switching to an object selection mode in which a specific object displayed on a screen may be selected in a corresponding application, when the multi-touch determining unit 410 determines that the multi-touch has been input. A user performs various operations through a screen according to switching to the object selection mode so that an object may be selected.

The starting point determining unit 450 determines a starting point for the sake of selecting an object, and a method of determining the starting point may be variously realized. The starting point may be identical with or different from the reference point which the reference point calculating unit 420 has calculated. Specific embodiments regarding this function will be described later with reference to FIGS. 12, 13, 14, and 15.

The moving path tracking unit 460 performs a function of tracking a moving path of the multi-touch as the multi-touch is moved on the screen. For example, a moving path of a multi-touch is generated when a user slides the touch on a screen without releasing the touch after inputting the multi-touch to the screen. At this time, information on the moving path of the multi-touch may be stored in a storage unit, such as storage unit 175.

The selected object determining unit 470 performs a function of determining at least one object, corresponding to the moving path of the multi-touch tracked by the moving path tracking unit 460, as a selected object.

The respective elements of the apparatus 400 are separately illustrated in the drawing for the sake of representing that the elements may be functionally and logically separated, but this does not necessarily imply that the elements are realized as physically separate elements or codes.

In the present specification, each functional unit may imply a functional and structural combination of hardware for the sake of implementing the spirit and scope of the present disclosure and software for the sake of driving the hardware. For example, the functional unit may imply a predetermined code and a logical unit of a hardware resource for execution of the predetermined code, and it can be readily deduced by one of ordinary skill in the art to which the present disclosure pertains that the functional unit does not necessarily imply physically connected codes or a kind of hardware.

Hereinafter, a procedure of selecting an object by using a multi-touch according to embodiments of the present disclosure will be described with reference to FIGS. 5, 6, 7, and 8.

Figure 5:
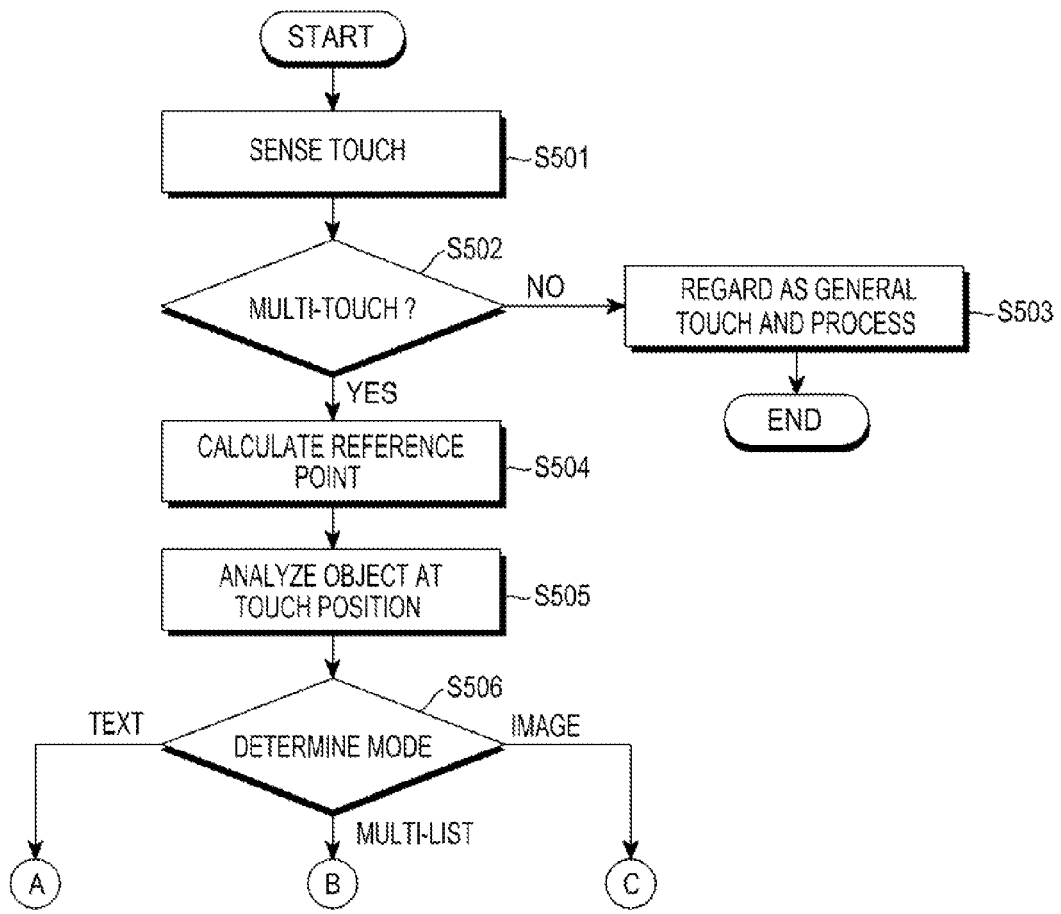
FIG. 5 is a flowchart illustrating a procedure of selecting an object by using a multi-touch according to an embodiment of the present disclosure.

FIG. 5 is a flowchart illustrating a procedure of selecting an object by using a multi-touch according to an embodiment of the present disclosure.

Referring to FIG. 5, when a touch is sensed on a touch screen included in an electronic device in operation S501, it is determined in operation S502 whether the touch corresponds to a multi-touch. When it is determined that the touch does not correspond to the multi-touch in operation S502, the touch is regarded as a general touch to be processed in operation S503.

On the other hand, when it is determined that the touch corresponds to the multi-touch in operation S502, switching to an object selection mode is performed so that at least one corresponding object may be selected. Thus, a reference point for an object analysis is calculated from a plurality of multi-touch locations in operation S504, and an object at the touch location is analyzed through analyzing a data characteristic at the calculated reference point in operation S505. The analyzed object may be any one of a text, an image, and a multi-list.

In operation S506, it is determined whether the analyzed object is a text, an image, and a multi-list. Based on the determination in operation S506, the procedure continues as illustrated in one of FIGS. 6, 7 and 8. That is, the procedure of selecting the object may be performed according to a procedure of FIG. 6 when the analyzed object corresponds to a text, may be performed according to a procedure of FIG. 7 when the analyzed object corresponds to a multi-list, and may be performed according to a procedure of FIG. 8 when the analyzed object corresponds to an image.

Figure 6:
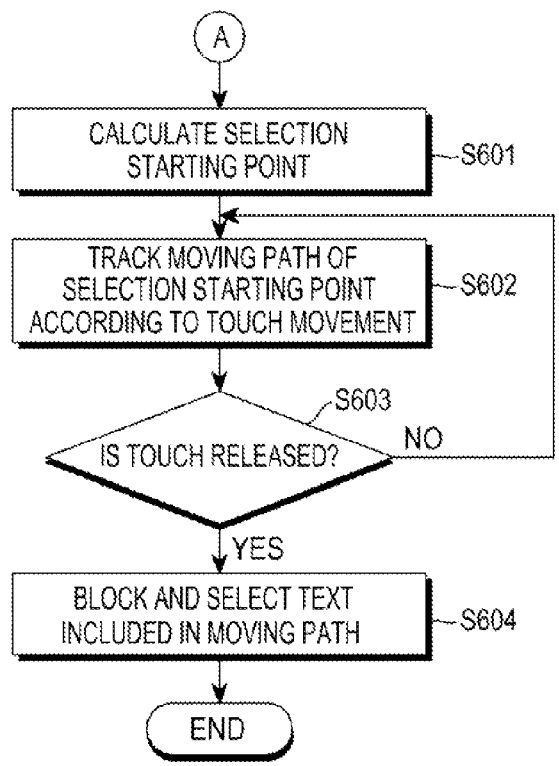
FIG. 6 is a flowchart illustrating a procedure of selecting a text by using a multi-touch according to a first embodiment of the present disclosure.
Figure 9:
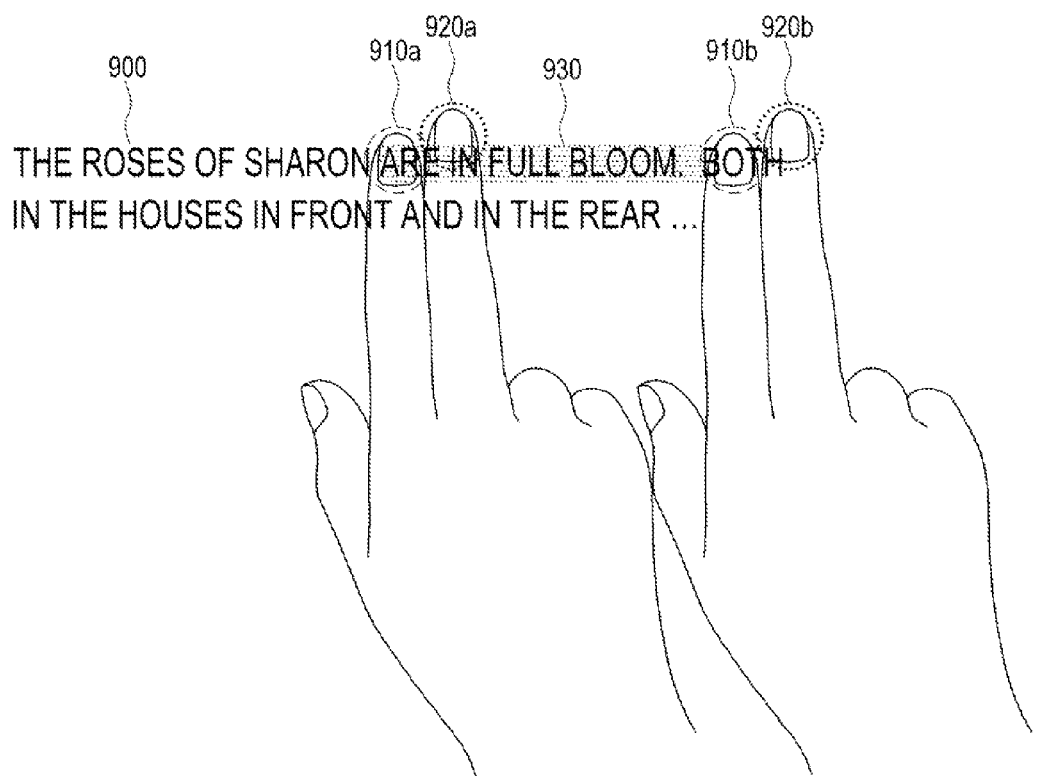
FIG. 9 illustrates an example of selecting a text on a screen according to an embodiment of the present disclosure.

FIG. 6 is a flowchart illustrating a procedure of selecting a text by using a multi-touch according to a first embodiment of the present disclosure. At least one corresponding text object may be selected through the procedure as illustrated in FIG. 6, when the object analyzed from the current multi-touch locations in FIG. 5 corresponds to a text as illustrated in FIG. 9.

Referring to FIG. 6, a reference point for object selection is calculated from the current multi-touch locations, and the reference point for the object selection, which has been calculated from the first multi-touch locations, is set as a selection starting point in operation S601. At this time, the starting point (namely, the selection starting point) of the reference point for the object selection may be substantially identical with or different from the reference point for the object analysis as described above.

The reference point for the object selection through the multi-touch is moved from the selection starting point when the multi-touch locations are moved (e.g., when a hand for the multi-touch is slid). Thus, a moving path of the reference point for the object selection which is calculated from the multi-touch locations is tracked in operation S602 in the embodiment of the present disclosure.

It is determined if the multi-touch is released in operation S603. When it is determined that the multi-touch is not released in operation S603, the process returns to operation S602 and continues the subsequent operations. When it is determined that the multi-touch is released in operation S603, text corresponding to the tracked moving path is selected in operation S604. At this time, a plurality of text may be blocked and selected when the plurality of text corresponds to the tracked moving path.

The text selected as described above may be used for a variety of functions that an application supports. Further, the selected text may be copied and then used in other applications.

Figure 7:
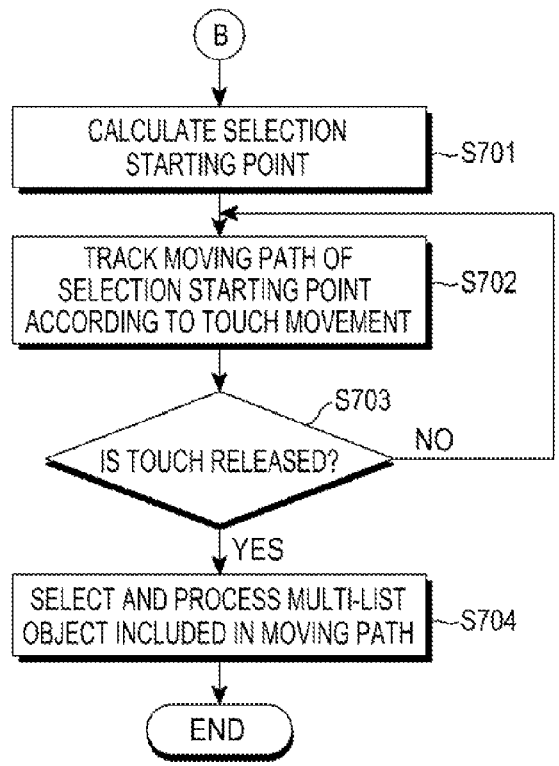
FIG. 7 is a flowchart illustrating a procedure of selecting a multi-list by using a multi-touch according to a second embodiment of the present disclosure.
Figure 10:
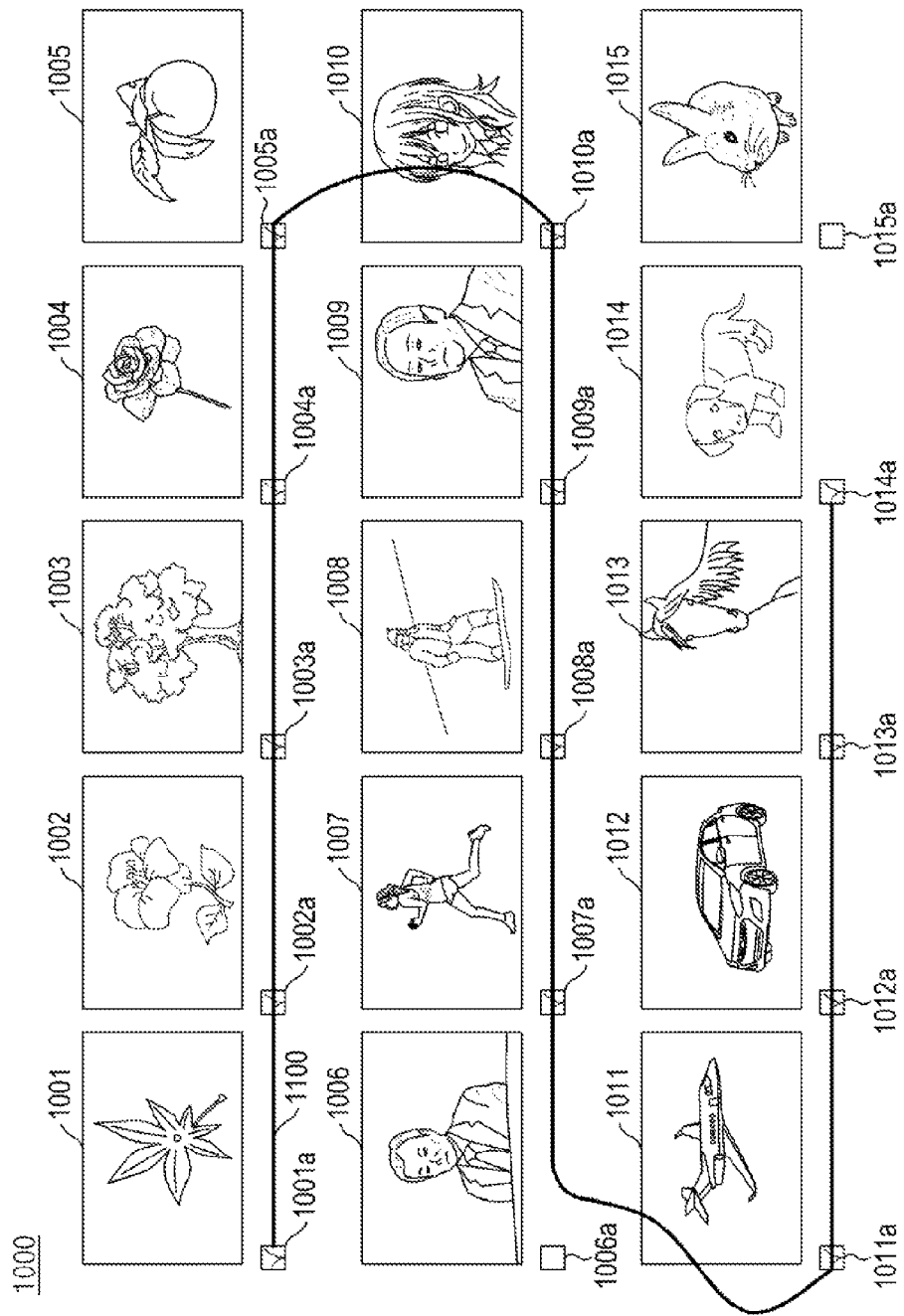
FIG. 10 illustrates an example of selecting a multi-list on a screen according to an embodiment of the present disclosure.

FIG. 7 is a flowchart illustrating a procedure of selecting a multi-list by using a multi-touch according to a second embodiment of the present disclosure. At least one object may be selected in the corresponding multi-list through the procedure as illustrated in FIG. 7, when the object analyzed from the current multi-touch locations in FIG. 5 corresponds to a multi-list as illustrated in FIG. 10.

Referring to FIG. 7, a reference point for object selection is calculated from the current multi-touch locations, and the reference point for the object selection, which has been calculated from the first multi-touch locations, is set as a selection starting point in operation S701. At this time, the starting point (namely, the selection starting point) of the reference point for the object selection may be substantially identical with or different from the reference point for the object analysis as described above.

The reference point for the object selection through the multi-touch is moved from the selection starting point when the multi-touch locations are moved (e.g., when a hand for the multi-touch is slid). Thus, a moving path of the reference point for the object selection which is calculated from the multi-touch locations is tracked in operation S702 in the embodiment of the present disclosure.

It is determined if the multi-touch is released in operation S703. When it is determined that the multi-touch is not released in operation S703, the process returns to operation S702 and continues the subsequent operations. When it is determined that the multi-touch is released in operation S703, specific objects in the multi-list corresponding to the tracked moving path are selected and processed in operation S704.

The objects selected as described above may be used for a variety of functions that an application supports. For example, when a plurality of images are selected as illustrated in FIG. 10, a function of copying or transmitting the selected images may be executed, however the present disclosure is not limited thereto.

Figure 8:
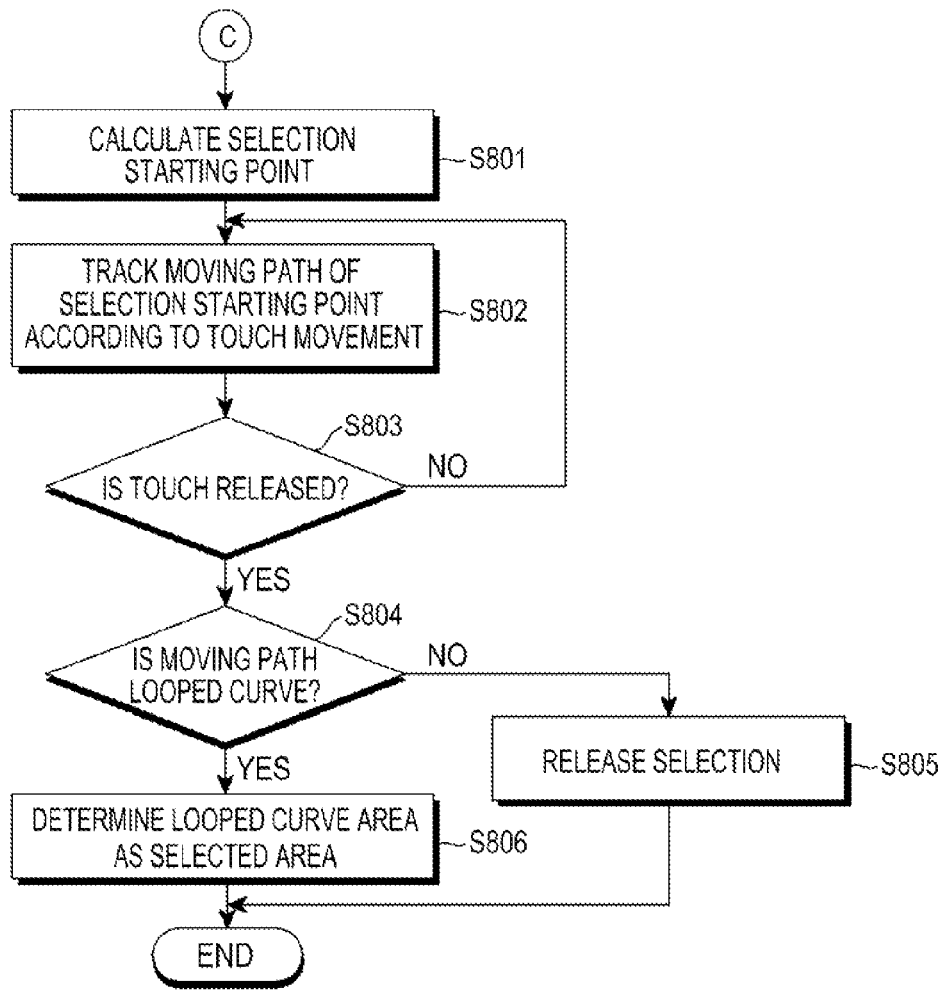
FIG. 8 is a flowchart illustrating a procedure of selecting an image by using a multi-touch according to a third embodiment of the present disclosure.
Figure 11:
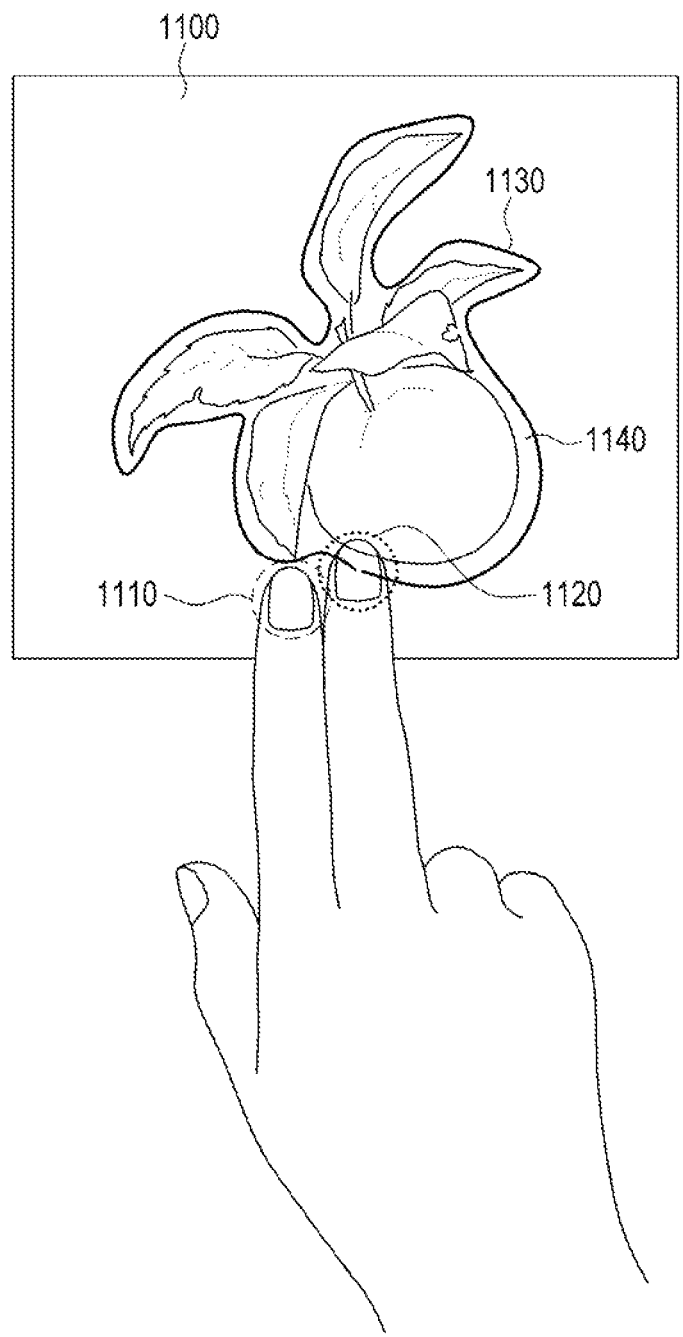
FIG. 11 illustrates an example of selecting an image on a screen according to an embodiment of the present disclosure.

FIG. 8 is a flowchart illustrating a procedure of selecting an image by using a multi-touch according to a third embodiment of the present disclosure. When the object analyzed from the current multi-touch locations in FIG. 5 corresponds to an image as illustrated in FIG. 11, a specific area in the corresponding image may be selected through the procedure as illustrated in FIG. 8.

Referring to FIG. 8, a reference point for object selection is calculated from the current multi-touch locations, and the reference point for the object selection, which has been calculated from the first multi-touch locations, is set as a selection starting point in operation S801. At this time, the starting point (namely, the selection starting point) of the reference point for the object selection may be substantially identical with or different from the reference point for the object analysis as described above.

The reference point for the object selection through the multi-touch is moved from the selection starting point, when the multi-touch locations are moved (e.g., when a hand for the multi-touch is slid). Thus, a moving path of the reference point for the object selection which is calculated from the multi-touch locations is tracked in operation S802 in the embodiment of the present disclosure.

It is determined if the multi-touch is released in operation S803. When it is determined that the multi-touch is not released in operation S803, the process returns to operation S802 and continues the subsequent operations. When it is determined that the multi-touch is released in operation S803, it is determined in operation S804 whether the moving path is a looped curve. When it is determined that the moving path is not a looped curve in operation S804, the selection may be released in operation S805, or it may be so processed that no area is selected.

On the other hand, when it is determined that the moving path is a looped curve in operation S804, the looped curve area may be determined as a selected area in operation S806.

The image area selected as described above may be used for a variety of functions that an application supports. Further, the selected image area may be copied and then used in other applications.

The methods according to the various embodiments of the present disclosure have been described above with reference to FIGS. 5, 6, 7, and 8.

The method of selecting an object by using the multi-touch according to an embodiment of the present disclosure may be realized in the form of a program command that can be performed through various computer units, and recorded in a computer readable medium. The computer readable medium may include a program command, a data file, and a data structure independently or in combination. The program command recorded in the medium may correspond to what is specially designed and configured for the present disclosure, or what is well known to those skilled in the computer software fields to be used. The computer readable medium includes a magnetic media such as a hard disk, a floppy disk and a magnetic tape, an optical media such as a CD-ROM and a DVD, a magneto-optical media such as a floptical disk, and a hardware, such as a ROM, a RAM, and a flash memory, which is specially configured to store and execute the program command. The program command includes a high level language code, which can be executed by a computer through an interpreter, as well as a machine language code as made by a compiler. The above-described hardware device may be configured to operate as one or more software modules for the sake of performing an operation of the present disclosure, and vice versa.

Hereinafter, embodiments of the present disclosure which are realized on a screen of an electronic device will be described with reference to FIGS. 9, 10, and 11. FIG. 9 illustrates an example in which a text object is selected through a multi-touch, FIG. 10 illustrates an example in which an object in a multi-list is selected through a multi-touch, and FIG. 11 illustrates an example in which a specific area of an image is selected through a multi-touch.

Referring to FIG. 9, the text "are in full bloom" 930 may be blocked and selected according to an embodiment of the present disclosure, when a user multi-touches the vicinity of the text "are" with two fingers (e.g., index and middle fingers 910*a* and 920*a*) and slides the multi-touch fingers to locations 910*b* and 920*b* right before the text "Both", in a state where the text 900 of "The roses of Sharon are in full bloom." is displayed on a screen. That is, when a reference point, calculated from the touch points of the index and middle fingers 910*a* and 920*a*, is moved according to a sliding motion, all text corresponding to the moving path of the reference point may be selected. Accordingly, the user may readily select the desired text area through one simple touch.

Referring to FIG. 10, a plurality of images 1001, 1002, 1003, 1004, 1005, 1006, 1007, 1008, 1009, 1010, 1011, 1012, 1013, 1014, and 1015 may each be displayed in the form of a thumbnail on a screen 1000. Check boxes 1001*a*, 1002*a*, 1003*a*, 1004*a*, 1005*a*, 1006*a*, 1007*a*, 1008*a*, 1009*a*, 1010*a*, 1011*a*, 1012*a*, 1013*a*, 1014*a*, and 1015*a* may each be displayed on lower sides of the thumbnail images, respectively. Generally, a user must individually select each of the corresponding check boxes 1001*a* to 1015*a* displayed adjacent to the respective thumbnail images in order to select desired images among the plurality of thumbnail images 1001 to 1015. That is, ten touches are necessary for the sake of selecting ten images.

However, in an embodiment of the present disclosure, a user multi-touches the check box (e.g., the first check box 1001*a*) of the specific image to select, and slides the touch for the images which the user desires to select, thereby readily selecting a plurality of images only through one touch.

For example, a user multi-touches the first check box 1001*a*, and then slides the touch in an order of the second, third, fourth, fifth, tenth, ninth, eighth, seventh, sixth, eleventh, twelfth, thirteenth, and fourteenth check boxes 1002*a*, 1003*a*, 1004*a*, 1005*a*, 1010*a*, 1009*a*, 1008*a*, 1007*a*, 1006*a*, 1011*a*, 1012*a*, 1013*a* and 1014*a*, so that a plurality of corresponding images may be selected.

Referring to FIG. 11, an area 1140 within a looped curve 1130 may be selected, when a user multi-touches specific points of an image 1100 with two fingers (e.g., index and middle fingers 1110 and 1120), and forms the looped curve 1130 through a sliding motion of the multi-touch fingers, in a state where the image 1100 is displayed on a screen.

That is, the area 1140 within the looped curve may be selected, when a reference point calculated from touch points of the index and middle fingers 1110 and 1120 is moved according to the sliding motion, and a moving path of the reference point forms the looped curve 1130. Accordingly, a user may readily select the desired image area on the screen only through one simple touch.

Hereinafter, methods of determining a reference point (e.g., a reference point for determination of an object type, or a reference point for object selection) and a selection starting point according to embodiments of the present disclosure will be described with reference to FIGS. 12, 13, 14, and 15.

Figure 12:
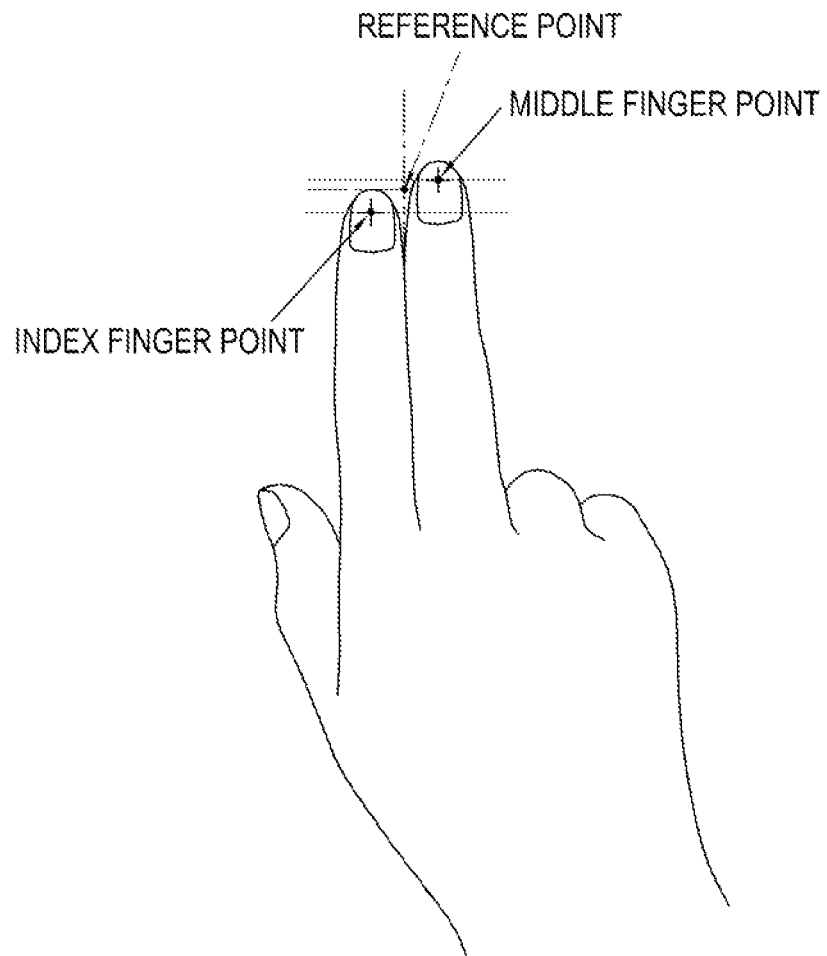
FIGS. 12, 13, 14, and 15 illustrate examples of determining a reference point from multi-touch points according to embodiments of the present disclosure.

Referring to FIG. 12, a reference point for determination of an object type may be calculated based on two touch points. At this time, a midpoint between the two touch points may be calculated as the reference point as described above, and the reference point may be calculated through assigning a weight to the respective touch points.

For example, in calculating the reference point, a weight may be assigned to a horizontal coordinate of the reference point such that the horizontal coordinate is located closer to the touch point of an index finger, and a weight may be assigned to a vertical coordinate of the reference point such that the vertical coordinate is located closer to the touch point of a middle finger.

Meanwhile, a selection starting point may be calculated based on the reference point, or may also be calculated from the two touch points after the reference point is calculated as illustrated in FIG. 12.

Figure 13:
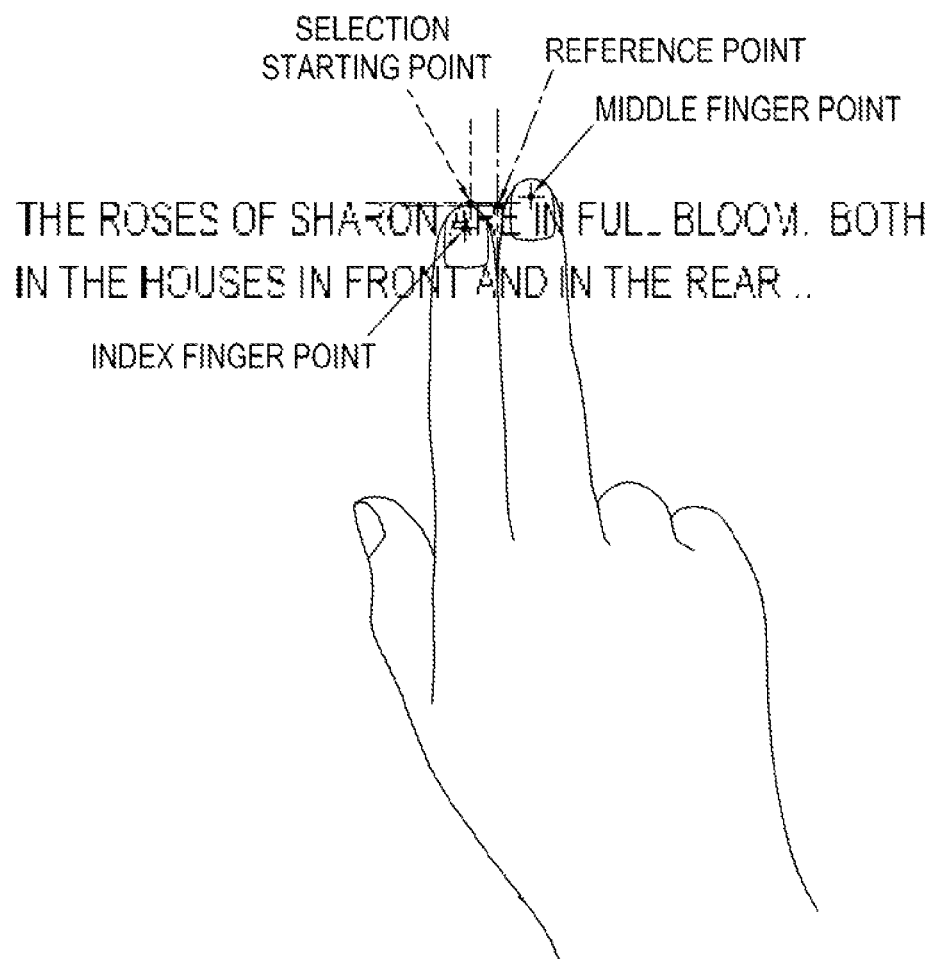

FIG. 13 illustrates an example of calculating a selection starting point in a case where an object to be selected is text according to an embodiment of the present disclosure.

Referring to FIG. 13, a horizontal coordinate of the selection starting point may be set to be located on a left side of a reference point, when an object that will be selected in an object selection mode is text. According to such a method as described above, when a multi-touch is input through index and middle fingers, a location of the selection starting point is calculated to be situated closer to the index finger so that the text may be accurately selected according to an intension of the user.

Figure 14:
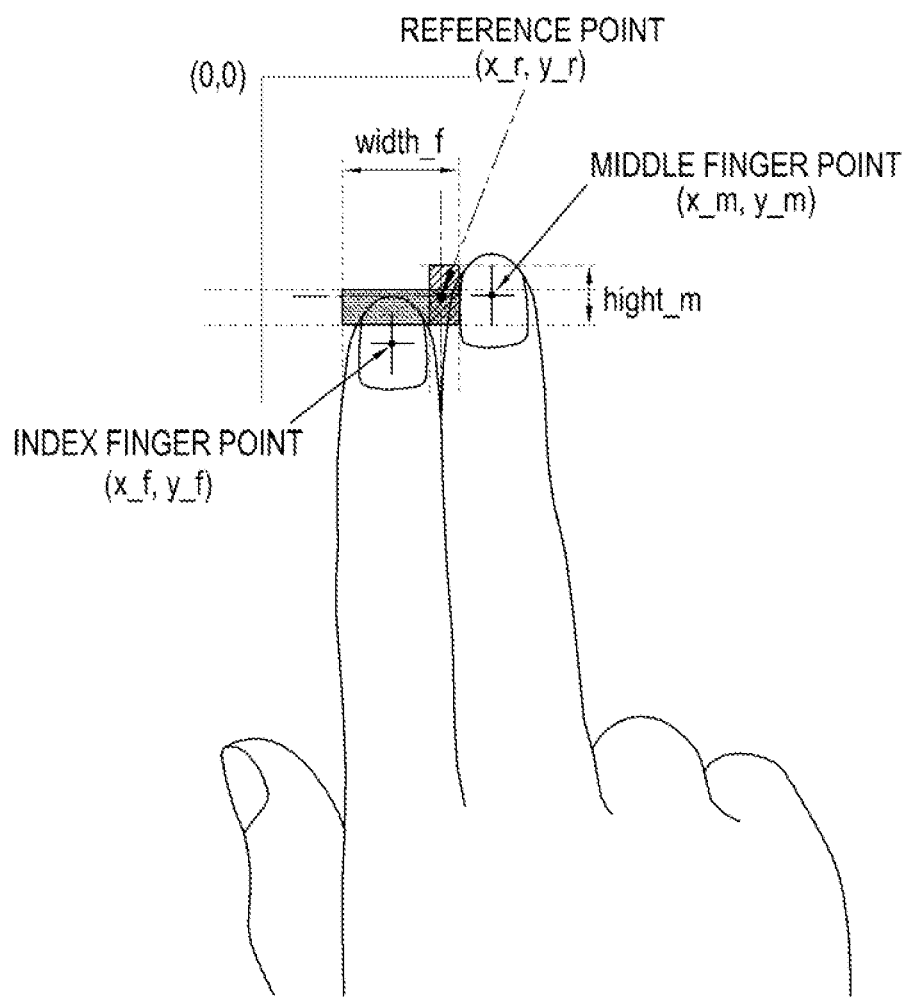
Figure 15:
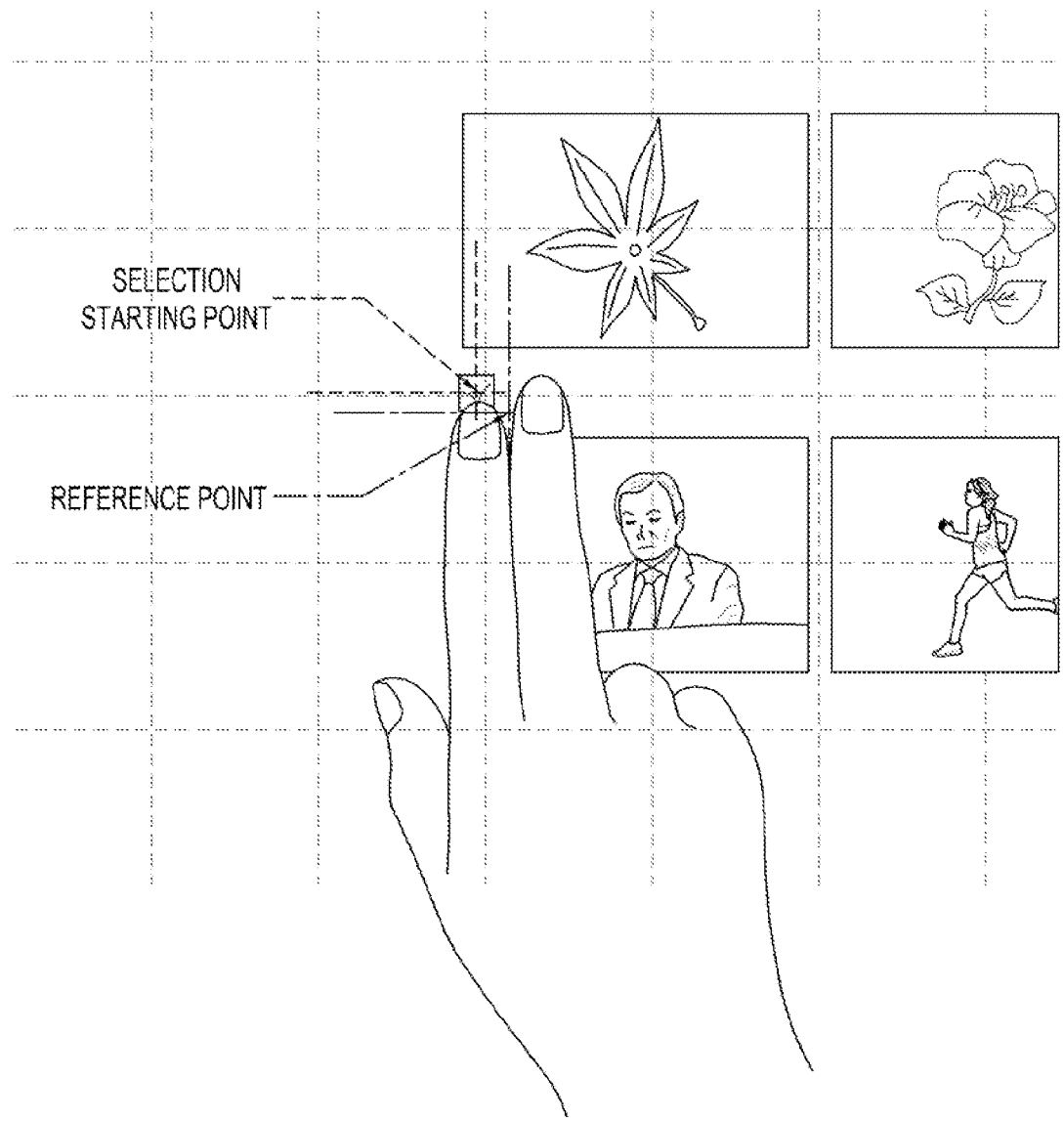

FIGS. 14 and 15 illustrate examples of calculating a selection starting point in a case where an object to be selected is a multi-list according to an embodiment of the present disclosure.

Referring to FIGS. 14 and 15, a point that satisfies the following conditions may be determined as a selection starting point when an object that will be selected in an object selection mode is a multi-list.

First condition: a distal end area of an index finger
Second condition: a left side surface area of a middle finger
Third condition: coordinates of an object in a second quadrant that is closest to a reference point Thus, an arbitrary point within an area satisfying the first and second conditions may be determined as a selection starting point, and a point satisfying the third condition may be selectively determined as a selection starting point.

Meanwhile, a location of a selection starting point may be used identically with a location of a reference point when an object that will be selected is an image.

Further, when a location of a multi-touch is moved (e.g., a hand touching a screen is slid) and thus is close to an edge of a screen, according to another embodiment of the present disclosure, the screen is switched to a next page, and an object may also be continuously selected on the switched screen.

Although the present disclosure has described the specific matters such as concrete components, the limited embodiments, and the drawings, they are provided merely to assist in a general understanding of the present disclosure and the present disclosure is not limited to the various embodiments. Various modifications and changes can be made from the description by those skilled in the art.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of selecting an object by using a multi-touch, the method comprising:
    determining whether at least two touches are input to a touch screen of an electronic device;
    determining a reference point from touch points where the at least two touches have been input and a selection starting point from the touch points where the at least two touches have been input, when it is determined that the at least two touches have been input, wherein the reference point is spaced apart from the selection starting point;
    analyzing a type of the object at the determined reference point, after the determining of the reference point;
    tracking a path along which the determined selection starting point is moved, as the at least two touch points are moved on the touch screen; and
    selecting at least one object according to the moving path of the selection starting point on a screen displayed on the touch screen and the analyzed type of the object.

2. The method of claim 1, further comprising:
    switching to an object selection mode, when it is determined that the at least two touches have been input.

3. The method of claim 1, wherein the determining of whether the at least two touches are input comprises:
    determining that the at least two touches have been input when a difference in touch times for the at least two touches is within a threshold time interval.

4. The method of claim 1, wherein the reference point is a midpoint between locations where the two or more touches have been input.

5. The method of claim 1, wherein the reference point is determined through assigning a weight to at least one location where the two or more touches have been input.

6. The method of claim 1, further comprising:
    setting a horizontal coordinate of the selection starting point to be closer to a touch location of a left touch among the two touches, in a case where it is determined through the analyzing of the type of the object that the object is text.

7. The method of claim 1, further comprising:
    determining an area within a looped curve as a selection area when the moving path of the selection starting point forms the looped curve, in a case where it is determined through the analyzing of the type of the object that the object is an image.

8. An apparatus for selecting an object by using a multi-touch, the apparatus comprising:
    a touch screen configured to display at least one object; and
    a controller configured to determine whether at least two touches are input to the touch screen, to determine a reference point from touch points where the at least two touches have been input and a selection starting point from the touch points where the at least two touches have been input when it is determined that the at least two touches have been input, wherein the reference point is spaced apart from the selection starting point, to analyze a type of the object at the determined reference point, after determining the reference point, to track a path along which the determined selection starting point is moved as the at least two touch points are moved on the touch screen, and to select at least one object according to the moving path of the selection starting point on a screen displayed on the touch screen and the analyzed type of the object.

9. The apparatus of claim 8, wherein the controller is further configured to control to switch into an object selection mode when it is determined that the at least two touches have been input.

10. The apparatus of claim 8, wherein the controller is further configured to determine that the at least two touches have been input when a difference in touch times for the at least two touches is within a threshold time interval.

11. The apparatus of claim 8, wherein the reference point is determined as a midpoint between locations where two or more touches have been input.

12. The apparatus of claim 8, wherein the reference point is determined through assigning a weight to at least one of locations where two or more touches have been input.

13. The apparatus of claim 8, wherein an object corresponding to at least one check box along the moving path of the selection starting point is selected, in a case where it is determined through the analyzing of the type of the object that the object is a multi-list.

14. A method for selecting an object, the method comprising:
    detecting a first touch input on a touch screen, the first touch input made at a first time and at a first touch point on the touch screen;
    detecting a second touch input on the touch screen, the second touch input made at a second time and at a second touch point on the touch screen;
    determining a reference point based on the first touch point and the second touch point and a selection starting point based on the first touch point and the second touch point, wherein the reference point is spaced apart from the selection starting point;
    analyzing a type of the object at the determined reference point, after the determining of the reference point;
    tracking a path of the selection starting point as the first touch point and the second touch point are moved on the touch screen; and
    selecting at least one object according to the moving path of the selection starting point on a screen displayed on the touch screen and the analyzed type of the object.

15. The method of claim 14, further comprising:
    switching to an object selection mode upon detection of the first touch input and the second touch input.

16. The method of claim 14, further comprising:
    determining if a difference between the first time and the second time is less than a threshold time interval.

17. The method of claim 14, wherein the reference point is a midpoint between the first touch point and the second touch point.

18. The method of claim 14, wherein the reference point is determined through assigning a weight to at least one of the first touch point and the second touch point.

19. The method of claim 14, further comprising:
    setting a horizontal coordinate of the selection starting point to be closer to a location of a left touch among the first touch input and the second touch input, in a case where it is determined through the analyzing of the type of the object that the object is text.

20. The method of claim 14, further comprising:
determining an area within a looped curve as a selection area when the moving path of the selection starting point forms the looped curve, in a case where it is determined through the analyzing of the type of the object that the object is an image.

21. An apparatus for selecting an object, the apparatus comprising:
a touch screen configured to display at least one object; and
a controller configured to detect a first touch input on the touch screen, the first touch input made at a first time and at a first touch point on the touch screen, to detect a second touch input on the touch screen, the second touch input made at a second time and at a second touch point on the touch screen, to determine a reference point based on the first touch point and the second touch point and a selection starting point based on the first touch point and the second touch point, wherein the reference point is spaced apart from the selection starting point, to analyze a type of the object at the determined reference point, after determining the reference point, to track a path of the selection starting point as the first touch point and the second touch point are moved on the touch screen, and to select at least one object according to the moving path of the selection starting point on a screen displayed on the touch screen and the analyzed type of the object.

22. The apparatus of claim 21, wherein the controller is further configured to switch to an object selection mode upon detection of the first touch input and the second touch input.

23. The apparatus of claim 21, wherein the controller is further configured to determine if a difference between the first time and the second time is less than a threshold time interval.

24. The apparatus of claim 21, wherein the reference point is a midpoint between the first touch point and the second touch point.

25. The apparatus of claim 21, wherein the reference point is determined through assigning a weight to at least one of the first touch point and the second touch point.

26. The apparatus of claim 21, wherein the controller is further configured to set a horizontal coordinate of the selection starting point to be closer to a location of a left touch among the first touch input and the second touch input, in a case where it is determined through the analyzing of the type of the object that the object is text.

27. The apparatus of claim 21, wherein the controller is further configured to determine an area within a looped curve as a selection area when the moving path of the selection starting point forms the looped curve, in a case where it is determined through the analyzing of the type of the object that the object is an image.

* * * * *